(12) United States Patent
McKinney

(10) Patent No.: US 8,494,895 B1
(45) Date of Patent: Jul. 23, 2013

(54) PLATFORM MATURITY ANALYSIS SYSTEM

(75) Inventor: David U. McKinney, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 733 days.

(21) Appl. No.: 12/639,902

(22) Filed: Dec. 16, 2009

(51) Int. Cl.
*G06Q 10/00* (2006.01)

(52) U.S. Cl.
USPC .................. 705/7.29; 705/7.12; 705/7.31

(58) Field of Classification Search
USPC ........................................ 705/7.12, 7.29–31
See application file for complete search history.

(56) References Cited

U.S. PATENT DOCUMENTS

| | | | |
|---|---|---|---|
| 6,578,009 B1 * | 6/2003 | Shinozaki .................... | 705/36 R |
| 7,657,470 B1 * | 2/2010 | Delurgio et al. ................. | 705/35 |
| 7,672,866 B2 * | 3/2010 | Venkatraman et al. ...... | 705/7.35 |
| 2003/0110109 A1 * | 6/2003 | Conkwright et al. ........... | 705/35 |
| 2004/0024644 A1 * | 2/2004 | Gui et al. ......................... | 705/22 |
| 2004/0103015 A1 * | 5/2004 | Schaffrath et al. ................ | 705/8 |
| 2004/0249769 A1 * | 12/2004 | Mathews et al. ............... | 705/400 |
| 2005/0283394 A1 * | 12/2005 | McGloin et al. ................. | 705/10 |
| 2006/0224434 A1 * | 10/2006 | Rumi et al. ....................... | 705/10 |
| 2008/0270314 A1 * | 10/2008 | Birney et al. .................... | 705/80 |
| 2009/0048906 A1 * | 2/2009 | Carnegie et al. ................ | 705/10 |
| 2010/0042479 A1 * | 2/2010 | Mathews et al. ................ | 705/10 |
| 2010/0321304 A1 * | 12/2010 | Rofougaran .................. | 345/173 |
| 2011/0131078 A1 * | 6/2011 | Dennard et al. ............. | 705/7.31 |

OTHER PUBLICATIONS

Berg, P. et al., "Assessment of Quality and Maturity Level of R & D" (2002) International Journal of Production Economics, vol. 78, pp. 29-35.*
Dooley, K., et al., (2001), "Maturity and its Impact on New Product Development Project Performance," Research in Engineering Design, 13: 23-29.*
Linden et al., (2003), "Understanding Gartner's Hype Cycles", Gartner: Strategic Analysis Report (R-20-1971) (12 pages).*
Mahafza, S. et al., "A Performance-based Technology Assessment Methodology to Support DoD Acquisition" (Dec. 2004), Defense AR Journal: vol. 11, Iss. 3, pp. 268-283.*
Siemens, "Driving product success; Using PLM to turn more ideas into successful products", brochure, Siemens Product Lifecycle Management Software, Inc., Plano, Texas 2009.
Siemens, "Lifecycle DNA; Making metrics-based PLM investment decisions", brochure, Siemens Product Lifecycle Management Software, Inc., Plano, Texas 2008.
"Form 8-K", http://en.wikipedia.org/w/index.php?title=Form_8-K &printable=yes, Jul. 15, 2009.
"Form 10-K", http://en.wikipedia.org/w/index.php?title=Form_10-K&printable=yes, Jul. 15, 2009.
"Product lifecycle management", http://en.wikipedia.org/wiki/Product_lifecycle_management, Jul. 27, 2009.

* cited by examiner

*Primary Examiner* — Andre Boyce
*Assistant Examiner* — Tiphany Dickerson

(57) ABSTRACT

A system comprising a computer having a processor, a memory, and an application stored in the memory is disclosed. The application, when executed by the processor, aggregates data of a plurality of types of data in a data store, analyzes the aggregated data to produce a first curve of a maturity metric of the first product platform versus time, and presents the first curve.

18 Claims, 3 Drawing Sheets

PLATFORM MATURITY ANALYSIS SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In order to deploy a new product platform, such as worldwide interoperability for microwave access (WiMAX) and/or long-term evolution (LTE), several milestones may be encountered. These milestones may include the acceptance of a standard for the technology, the delivery to market of product platform specific componentry such as a chipset for implementing the standard, build-out of an infrastructure including base transceiver stations and handsets using the chipset and implementing the standard, and so on. Many product platforms, such as devices, systems, services, protocols, technologies, and so on may undergo these and/or other milestones as the progress through their lifecycles.

SUMMARY

In an embodiment, a system is disclosed. The decision support system comprises a computer having a processor, a memory, and an application stored in the memory. The application, when executed by the processor, aggregates data of a plurality of types of data in a data store, wherein the types of data comprise at least a research and development expense of a semiconductor chip manufacturer in a first product platform data type, a research and development expense of an equipment manufacturer in the first product platform data type, a status of a technical standard of the first product platform data type, a capital expenditure of an enterprise on the first product platform data type, and a revenue generated by the first product platform data type. The application analyzes the aggregated data to produce a first curve of a maturity metric of the first product platform versus time, and presents the first curve.

In an embodiment, a method is disclosed. The method comprises inputting into a data store, via a computer, information about a research and development investment by a semiconductor chip manufacturer, information about a research and development investment by a communication equipment manufacturer, information about a status of a technical standard related to the product platform, information about a capital expenditure of an operating company on the product platform, and information about a revenue generated by the product platform. The method further comprises the processor of the computer analyzing the information in the data store to produce a curve of the maturity of the product platform versus time. The method further comprises the computer presenting the curve. The method further comprises inputting a decision about investing in the product platform based on the curve.

In an embodiment, a computer based decision support system is disclosed. The computer based decision support system comprises a computer having a processor and a memory, and an application stored in the memory. The application, when executed by the processor, aggregates data from at least two data types comprising a research and development expense of a semiconductor chip manufacturer in a product platform data type, a research and development expense of an equipment manufacturer in the product platform data type, a status of a technical standard of the product platform data type, a capital expenditure of an enterprise on the product platform data type, and a revenue generated by the product platform data type. The application analyzes the aggregated data to determine a sensitivity of a maturity metric of the product platform versus time to a variation in data from one of the at least two data types, presents the sensitivity of the maturity metric of the product platform versus time to a variation in data, wherein a decision maker visualizes the value of obtaining further data of the data type subject to the sensitivity analysis, and analyzes the aggregated data to produce a curve of a maturity metric of the product platform versus time. The application presents the curve of the maturity metric versus time, and a decision maker visualizes and makes decisions based on the current and future acceptance of the product platform.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
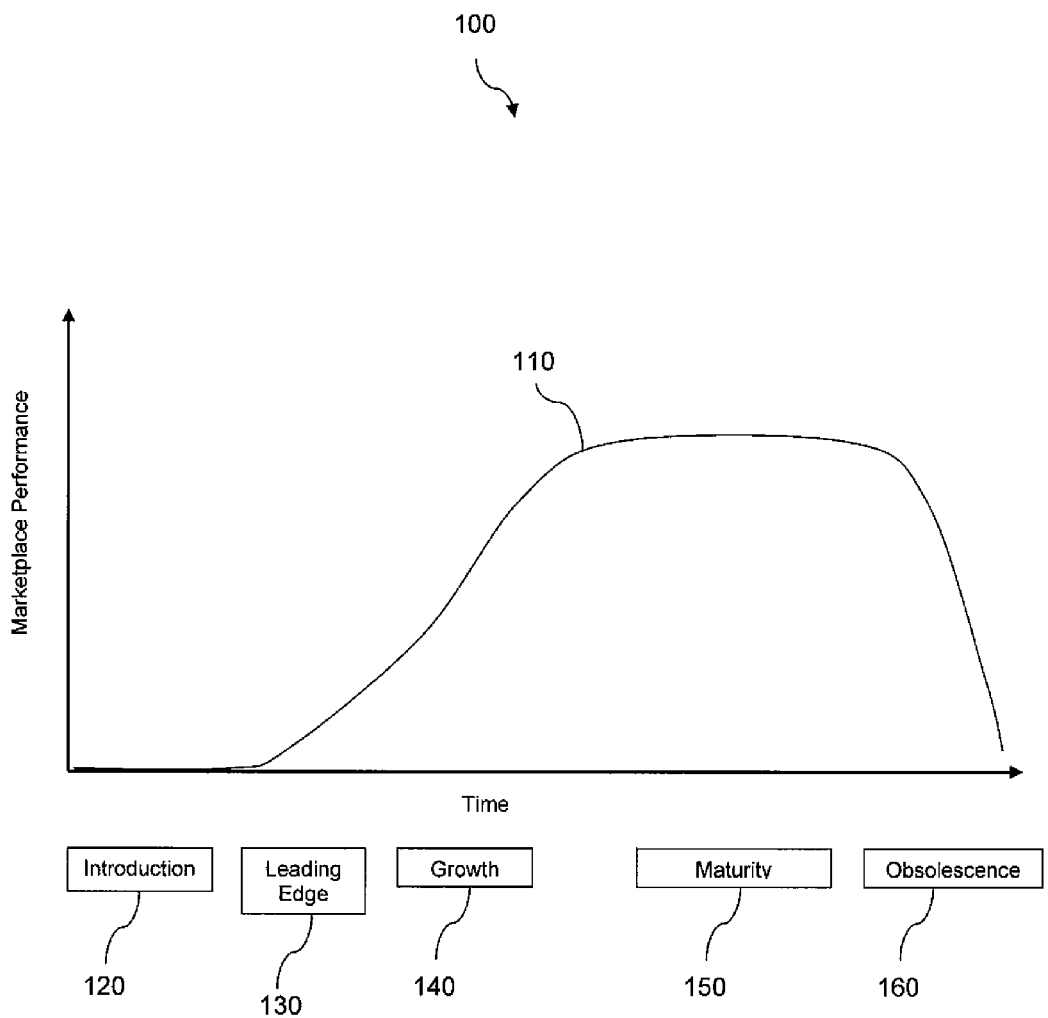
FIG. 1 illustrates a curve depicting stages of a product platform lifecycle according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and method to analyze the maturity of a product platform or technology platform. Analyzing the maturity of the platform may comprise modeling the lifecycle of the platform. In an embodiment, internal company data and data from external sources, along with any other sources of data and/or information that may be relevant to the model, are gathered, temporarily stored, organized, and analyzed to produce a model of a product platform lifecycle. The model may include one or more of a curve that represents the product platform lifecycle, an estimation of the current location of the product platform on the product platform lifecycle curve, an estimated velocity of the product platform as it moves forward on the product platform lifecycle curve, and a representation of the accuracy of the model of the product platform lifecycle. The model may assist in strategic decision making with regard to investing in the product platform. In an embodiment, the system and method may analyze internal data and external data such as customer spend data, equipment provider research and development investment data, spectrum activity, competitor revenue data, company revenue data, company investment cost data and/or other data to generate a model of a lifecycle of a product platform. A decision maker may visualize the product platform lifecycle curve, and take into consideration the velocity of the product platform on the product platform lifecycle curve, as well as the representation of accuracy of the model in order to make an informed decision about if and/or when to invest in the product platform. In this disclosure, the terms "platform" and "product platform" may be used interchangeably to describe devices, systems, services, protocols, and/or technologies comprising an environment that may be used for generating revenue. Also, in this disclosure, the term velocity is used in an analogous manner to describe rates of change of the position of the product platform, with respect to time, as it moves along the product platform lifecycle curve. In addition, the term acceleration is used in an analogous manner to describe the rate of change of the velocity of the product platform along the product platform lifecycle curve. Velocity may be considered to be the first derivative of the position of the product platform, with respect to time, as it moves along the product platform lifecycle curve, and acceleration may be considered to be the second derivative of the position of the product platform, with respect to time, as it moves along the product platform lifecycle curve.

In an embodiment, a user or a decision maker may use a product platform lifecycle model and an approximation of the current location in the lifecycle of the product platform, in order to make decisions regarding investing in the product platform. In an embodiment, the data utilized in generating the product platform lifecycle estimation may be data that is internal to a subject company or data from external to a subject company and may be of the leading indicator type or lagging indicator type. Leading indicator data is data that changes before the subject of the data changes, and lagging indicator data is data that changes after the subject of the data changes. For example, revenue generated by a product would be a lagging indicator, in that the data is representative of monies that have already been received by virtue of sale of the product. On the other hand, a leading indicator might be the construction of infrastructure for growth and/or expansion of a product platform, in that it may indicate that the product platform is poised to expand and therefore increased sales may be anticipated in the future.

Internal data may be gathered from sources within a company or entity from sources such as financial statements, accounting records, marketing reports, inventory records, internal memoranda, and so on. Some external data may be challenging to collect, as external companies may be reluctant to share information that they may consider proprietary or competitive in nature. It may therefore be necessary to use sources of data from companies which may be in the public domain, and which therefore may be readily available and may meet the need. For instance, the external company may be required to file a form 8-K, form 10-K, and/or form 10-Q or similar with U.S. Securities and Exchange Commission (SEC) or other governing agencies or bodies. If so, the information disclosed therein may be publicly available and may provide information and/or data such as business information, risk factors, legal proceedings, market information, financial data, and/or other for use in the analysis and subsequent generation of the product platform lifecycle model.

There are also other sources of information, such as the external company's annual reports or other government filings which may help in the accumulation of data for analysis. Also, public sources such as financial publications, information gathering entities such as Dunn & Bradstreet, government agencies, and so on may provide additional data and information relevant to the analysis. In addition, it may be possible to solicit information directly from company personnel, for example by interviewing company executives to glean information pertaining to a particular product platform.

During the lifetime of a product platform, from the time it is developed until it becomes obsolete, it may go through several stages. The stages may include introduction, leading edge, growth, maturity, and obsolescence. In some instances, these stages may be referred to by other names. For instance, the introduction stage may be called the incubation stage. In some cases, the obsolescence stage may be known as the declining stage. Also, in some instances, there may be an additional phase at the end of the product platform lifecycle called the end-of-life stage. This disclosure should be considered to include any/all terms employed in the description of the various phases of a product platform lifecycle, regardless of the number of stages described or the names utilized in their description.

Knowing where a product platform is in this lifecycle may provide insight into the practicality of investing in the platform. For example, if a product platform has been at a mature stage for some period of time, but shows signs of trending toward obsolescence, it may not be prudent to invest heavily in the platform, as the product platform may not be viable for much longer, and may not deliver acceptable return on investment. On the other hand, if a product platform indicates that it is about to undergo a transition from the leading edge stage to the growth stage, wherein its marketplace performance and resultant revenue may trend upward, investing in infrastructure to support the growth may be wise. The ability to model the lifecycle using a richer and/or more robust data set and to get an approximation of where the product platform is in its lifecycle, as well as the velocity and/or acceleration at which the product platform is currently travelling along its lifecycle may provide an indication of the practicality of investing in the platform at a given time.

The current disclosure teaches a system and method for analyzing product platform data and information in order to model the lifecycle of the product platform. The model may include a product platform on the lifecycle curve, an estimation of the current position of the product platform on the lifecycle curve, an estimated velocity of the product platform along the lifecycle curve, and an indication of an accuracy of the model. The lifecycle curve provides a visualization of the lifecycle curve of the product platform. The velocity estimation is intended to give an indication of how fast it may reach a particular point on the lifecycle curve. The velocity and acceleration of the product platform as it moves along the product platform lifecycle curve may be useful in predicting certain features of interest of the product platform lifecycle curve. For instance, in the early part of the lifecycle curve, the acceleration is increasing. In the middle of the growth portion of the lifecycle curve, the acceleration goes to zero, but velocity becomes constant. As the product platform undergoes the transition from the growth stage to the maturity stage, acceleration becomes negative as the product platform decelerates. These and similar observations may be useful in predicting valuable aspects of the product platform lifecycle curve, such as the curve maximum of the transition points of stages. The estimation of the accuracy of the model of the lifecycle curve may give the system user the ability to infer a confidence level in the model.

Data gathered for analysis and modeling may be in a variety of formats, forms, styles, and such. For example, some data may be revenue data, and therefore may be in terms of dollars per unit time or dollars per unit volume, while other data may be inventory data, and may be of the form of units per location. The disclosure may provide the ability to integrate disparate forms of data into a form or format that facilitates correlation and analysis. Methods such as neural networks, nearest neighbor methods, and/or decision trees may be employed in preprocessing of the data in order to help in the organization and/or structure of the data prior to analysis.

In addition, the system and method may provide the ability to apply weighting factors and ranges to some portions of the data in order to maximize the accuracy of the model. For instance, if a particular data set is suspect in its reliability, but may still be relevant, it may be appropriate to assign a relatively low weighting factor to this data in order to downplay the importance of the data in generating the model. If some of the data is of a range that is outside the scope of interest to the system user, the system and method may provide a means of setting ranges on the data to exclude portions of the data that may not be relevant to the model. The data may be analyzed via one or more methods of descriptive statistics, exploratory data analysis, predictive analytics, or other process in order to generate the model. The disclosure provides a systematic, methodical, and accurate way of generating a product platform lifecycle model to provide insight into the lifecycle of the product platform to an audience that may be less sophisticated than a professional data analyst.

Through analysis, reflection, experience, and/or or other means, it may be observed that some product platform lifecycles are more sensitive to particular data and/or information, in terms of the relative effect this data and/or information has on the product platform lifecycle model. In such instances as the relative sensitivity to a certain type of data and/or information is considered to be high, a system user may decide to take more care in collecting this data and/or information. For instance, if experience has indicated that the timing of the purchase of spectrum for a product platform is a key indicator of movement of a product platform from the leading edge stage to the growth stage, and gathering this information may require substantial resources, the system user may decide to allocate the necessary resources to garner this information. Conversely, if another portion of data and/or information is believed to have little-or-no effect on the accuracy of the product platform lifecycle model, the system user may decide to reduce or withhold resources from gathering this particular data and/or information.

Turning now to FIG. 1, an exemplary product platform maturity model 100 is illustrated. The product platform maturity model 100 illustrates a product platform lifecycle curve 110 on a graph of marketplace performance versus time. The product platform lifecycle curve 110 spans five stages in the lifecycle of a platform. The first stage is the introduction stage 120. The introduction stage is the stage at which the product platform may possess high potential for marketplace performance, but at this point it may not yet be realized. During the introduction stage 120, initial commercialization efforts may have high costs, and the product platform may have few customers who have purchased or adopted the product platform. In this stage, sales volumes are low, and it may be necessary to create a demand for the product platform and/or prompt customers to try the product platform. At this stage, as may be appropriate to the product platform, spectrum allocation is likely to have taken place, or concurrently may be underway. Also, at this stage there may be little or no competition. Competitors may be in a wait-and-see mode, wherein they may monitor the acceptance of the product platform by the marketplace before they enter into direct competition with the product platform. In addition, providers of equipment of the product platform, including end product and parts suppliers, may have developed prototypes of the product platform, but may not as yet have moved to full production of the product platform. Also, service providers of the product platform may have tested and deployed services related to the product platform, but may have only done so in a limited area. In addition, industry standards groups may have begun the process of developing standards related to the platform, but may not have ratified any of them, yet. While in the introduction stage 120, the product platform may not undergo any acceleration.

The next stage of the product platform lifecycle curve 110 is the leading edge stage 130. The leading edge stage 130 is the stage at which the product platform may be proven in the marketplace, but the product platform still may be new enough that it may be difficult to support a significant number of providers of the product platform and providers of equipment of the product platform, so availability of the product platform in the marketplace may be limited. At this stage, as appropriate to the product platform, spectrum allocation may have taken place, and spectrum purchase may be underway or completed. During this stage, the slope of the product platform lifecycle curve 110 may accelerate upward, but still may be relatively flat. At the leading edge stage 130, customers may be limited to early adopters and innovators. In addition, service providers may have tested and deployed services in an area larger than in the introduction stage 120, but still may not have expanded coverage to a large area. In addition, during the leading edge stage 130, industry standards groups may have ratified some standards relating to the platform, but still may be working on additional standards.

After the leading edge stage 130, the product platform may move into the growth stage 140. As the product platform enters the growth stage 140, the product platform lifecycle curve 110 may trend upward at a substantial rate. At this stage, as appropriate to the product platform, spectrum sales may have taken place, and spectrum buildout may be underway. In the growth stage 140, the product platform may have reached state of the art, and sales volume and revenue may increase significantly. Costs of production of the product platform may also have decreased, due to economies of scale associated with higher production volumes than in previous stages. As a result of increased revenue and decreased production costs, the profitability of product platform may increase significantly. In addition, during the growth stage 140, a large number of consumers may be purchasing the platform, and adoption of the product platform may be growing rapidly as market awareness of the product platform increases. Also, multiple providers of the product platform and equipment of the product platform may have emerged, which may provide competitive production of the product platform to ensue. In addition, service providers of the product platform may have deployed in a substantial number of markets, and may continue to expand coverage of services of the product platform during the growth stage 140. The growth stage 140 may also be indicated by work in industry standards groups becoming mature if, for instance, most standards related to the product platform may have been fully ratified. Also, during the growth stage, direct competitors may emerge, which may lead to price decreases. While these price decreases may negatively affect per-unit profit, they may also have the positive effect of increasing sales volumes further, so overall revenue and profit may still increase.

When the product platform moves on to the next stage, the maturity stage 150, the product platform is in the stage wherein its highest revenues may be generated. While the product platform still may be useful, additional competitive product platforms may be emerging, so competition may increase, and it may be appropriate to invest in additional features and/or enhancements for the product platform to maintain and/or increase market share. Also, at this stage, as appropriate to the product platform, spectrum buildout may still be underway or may have been completed. The product platform lifecycle curve 110 may decelerate and the slope may drop off and even may become flat. The alternative product platforms may cause the growth of new customers of the subject product platform to slow to somewhat flat levels and sales of the product platform may have begun to decline somewhat, or may have even stalled, and market saturation may be reached. During this stage, brand differentiation and diversification of features of competitive product platforms may emerge as competitors attempt to increase market share of competitive product platforms. Other indications that the product platform has entered the maturity stage 150 are that producers of the product platform and equipment of the product platform still may be producing units of and for the product platform, but at a slower rate than in previous stages, and the number of producers may have declined. This decline also may be indicated by an increase of inventory of the product platform, if in fact the product platform is a product and not a service. If the product platform is a service, a possible indication of decline might be a slowing of hiring of service staff or even staff reductions. Also, service providers of the product platform still may be deployed in a substantial number of markets, but there may be limited or no new investments in supporting the platform. In addition, work in industry standards groups may slow substantially or even cease when the product platform enters the maturity stage 150.

In the final stage, the obsolescence stage 160, the product platform may begin to be replaced by newer technology and sales volumes of the product platform may decrease sharply. At this stage, the product platform lifecycle curve 110 may begin to trend downward and the slope may become negative. The product platform still may be maintained, but consumers may no longer be purchasing the platform. Providers of service of the product platform may see revenues decline sharply, and support for the product platform may become an issue. At this stage, industry standards groups may be working on standards for replacement product platforms. Also, providers of the product platform and providers of parts of the product platform may no longer be producing units of or for the platform. In addition, providers of the product platform may have begun to encourage customers to adopt new product platforms to replace the existing product platform. During this stage, profit may become more of a challenge of optimizing production and distribution efficiencies, as sales increases become less likely.

As one skilled in the art may see, a visualization of the product platform lifecycle curve 110, the location of the product platform on the product platform lifecycle curve 110 at a given time, along with an indication of the speed with which the product platform is moving along the product platform lifecycle curve, may provide insight into the practicality of investing in the product platform. For instance, it should be apparent that further investments in a product platform that is entering the obsolescence stage 160 would not be prudent, as further investment in the product platform may not yield an acceptable return on investment. On the other hand, investing in a product platform that may be poised to enter the growth stage 140 may be advisable, as the platforms marketplace performance may be likely to increase substantially as it makes this transition.

Figure 2:
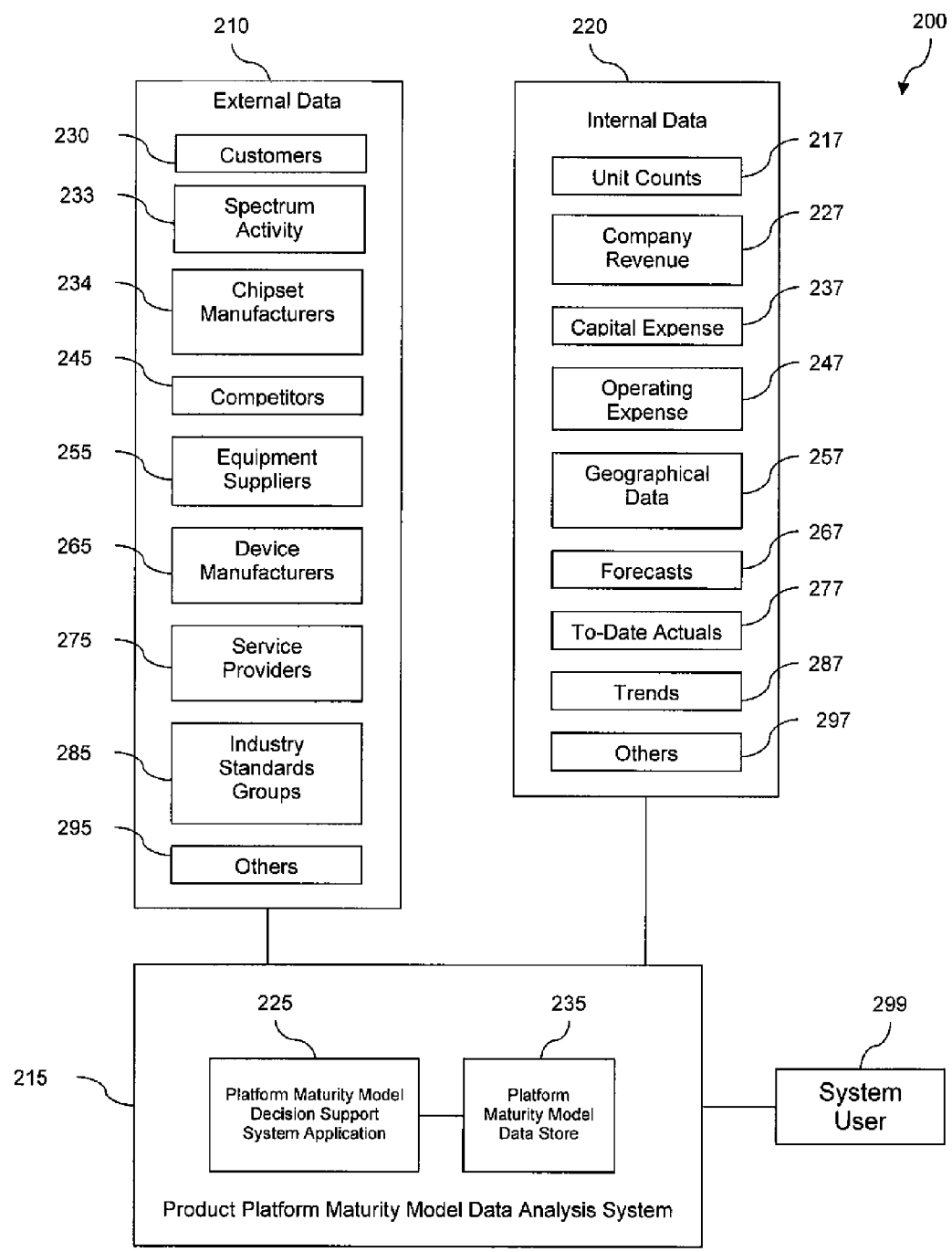
FIG. 2 illustrates a data analysis system according to an embodiment of the disclosure.

FIG. 2 illustrates a product platform maturity modeling system 200 for modeling a product platform lifecycle curve 110, according to an embodiment of the disclosure. The product platform maturity modeling system 200 comprises a source of external data 210, a source of internal data 220, and a product platform maturity model data analysis system 215. The product platform maturity model data analysis system 215 comprises a product platform maturity model decision support system application 225 and a product platform maturity model data store 235. In order to produce the model, a system user 299 of the product platform maturity modeling system 200 may employ the product platform maturity model data analysis system 215 to collect and analyze external data 210 such as customer data 230, spectrum activity data 233, chipset manufacturers' data 234, competitors' data 245, equipment suppliers' data 255, device manufacturers' data 265, service providers' data 275, industry standards groups' data 285, and/or other external data 295. In addition to the external data 210, the system user 299 may incorporate internal data sources 220 such as unit counts 217, company revenue 227, capital expenses 237, operating expenses 247, geographical data 257, forecasts 267, to-date actuals 277, trends 287, and/or other data 297 which may be pertinent to the product platform being modeled. As one skilled in the art would appreciate, it is not always possible or necessary to obtain all of the described data at the same time. For example, when the product platform is in an early stage, for instance the introduction stage 120, the product platform may not even be in production yet, so data such as unit counts 217 may not be relevant. One skilled in the art may determine which data are available and/or useful at an appropriate time, and may adjust data collection efforts accordingly.

The external data 210 and internal data 220 may be combined and temporarily stored in the product platform maturity model data store 235. The product platform maturity model decision support system application 225 may preprocess the data in the product platform maturity model data store 235 in order to facilitate analysis by the product platform maturity model decision support system application 225. The preprocessing may be one or more of cleaning, reformatting, transforming, consolidating, restructuring, normalizing, or other processing, and may organize data of different forms, styles, and/or formats into a form that may be more suitable for analysis and/or modeling. For example, normalizing to previously completed product platform lifecycles of similar product platforms may be appropriate preprocessing, and may help produce more accurate product platform lifecycle models. In addition, the system user 299 may provide refining input to the product platform maturity model data analysis system 215 by adjusting relative sensitivities and/or by setting appropriate ranges for some data, based on the system user's experience, market knowledge, insight, or other.

The preprocessing may comprise analyzing the data to determine a rate of change in the data at different points in time. This may be referred to in some contexts as a velocity of the data, wherein the velocity is based on a rate of change in data with respect to time. The preprocessing may comprise analyzing the data to determine a rate of change of the velocity of the data at different points in time. This may be referred to in some contexts as an acceleration of the data, wherein the acceleration is based on a rate of change of the velocity of the data with respect to time. Velocities and accelerations may be determined for individual types of data. Alternatively, velocities and accelerations may be determined for the product platform lifecycle curve 110 itself. The velocities and accelerations of data may be used to help identify where the platform is on the product platform lifecycle curve 110 and to project the product platform lifecycle curve 110 into the future. For example, if the product platform lifecycle curve 110 is currently located at a zero acceleration point, after having first experienced positive acceleration, in an embodiment, the inference may be drawn that the product platform is about half way through the growth stage 140. This inference may further be employed to provisionally project the remainder of the product platform lifecycle curve 110.

The system user 299 may also provide inputs that may not be identified by the internal data 210 and/or the external data 220. For instance, there may be triggering events, market news, or other information relevant to the analysis of which the system user 299 is aware, and that may influence the product platform lifecycle curve 110 so as to render a more accurate model. The product platform maturity model decision support system application 225 may incorporate all of the data and may utilize an algorithm to analyze the data temporarily stored in the product platform maturity model data store 235 to produce the product platform lifecycle model. The model may include a product platform lifecycle curve 110, an estimation of the product platform location on the product platform lifecycle curve 110, an estimation of the product platform's position on the product platform lifecycle curve 110, and a representation of the accuracy of the model of the product platform lifecycle curve 110. This representation of accuracy may be of the form of a correlation coefficient such as that generated by a classic linear regression analysis, or other form of indication of accuracy and/or correlation.

The representation of accuracy may allow the system user 299 to establish a relative level of confidence in the model for adjusting the dependence on the model as it influences decisions that are based on the model. For instance, if the product platform maturity model decision support system application 225 yields a representation of accuracy that is low, the system user 299 may have a low confidence in the result of the analysis, and may temper investment decisions derived from the analysis. On the other hand, a high representation of accuracy may instill a greater level of confidence in the result of the analysis by the product platform maturity model decision support system application 225, which may encourage the system user 299 to rely heavily on the analysis when making decisions regarding investing in the product platform.

In an embodiment, the system user 299 may utilize the product platform maturity model data analysis system 215 in an interactive and/or iterative manner to generate several product platform maturity curves 110 in order to visualize multiple scenarios of the product platform lifecycle curve 110 by adjusting appropriate sensitivities, ranges, and/or other input, information, or data. In this manner, the system user 299 may comprehend possible outcomes of various market influences on the product platform. The system user 299 may use the different product platform lifecycle curves 110 and the associated estimations of the stage of the product platform on the product platform lifecycle curve 110 to develop contingency plans and options for investing in the product platform, based on insight into the various scenarios as affected by market activity or other influences on the product platform or the marketplace.

In an embodiment, the system user 299 may employ the product platform maturity modeling system 200 to model, for example, a new broadband network product platform. The system user 299 may provide external data 210 from sources such as customers 230, spectrum activity data 233, chipset manufacturers 234, competitors 245, equipment suppliers 255, device manufacturers 265, service providers 275, industry standards groups 285, and/or other data 295 from any/all external sources as the system user deems relevant to the product platform of interest. The system user 299 may also provide internal data 220 of the form of unit counts 217, company revenue 227, capital expense 237, operating expense 247, geographical data 257, forecasts 267, to-date actuals 277, trends 287, and/or other data 297 as is relevant to the product platform of interest. The external data 210 may be data of same forms and/or types of data as the internal data 220. The product platform maturity model decision support system application 225 may accumulate the external data 210, and internal data 220 into the product platform maturity model data store 235. The aggregated data may be organized and analyzed by the product platform maturity model decision support system application 225. The product platform maturity model decision support system application 225 may generate the product platform model that may include a product platform lifecycle curve 110, an estimate of the current position on the product platform lifecycle curve 110, an estimated velocity and/or an estimated acceleration of the product platform on the product platform lifecycle curve 110, and a representation of accuracy of the product platform lifecycle curve 110. If, for instance, the product platform maturity model decision support system application 225 returns a product platform lifecycle curve 110 and indicates that the new broadband network is in the leading edge stage 130, the system user 299 may take this information and decide to invest in the new broadband network. If, by way of example, the product platform maturity model decision support system application 225 further indicates that the velocity of the product platform along the product platform lifecycle curve 110 is high, and the representation of accuracy of the model is 99 percent, the system user 299 may utilize this information to make a decision that the new broadband network may soon experience an increase in consumer adoption and rapid growth, and the system user 299 may accelerate the investment in the new broadband network product platform in order to add infrastructure to support the projected growth in order to prevent a delay in the growth.

As one skilled in the art may realize, while the disclosure illustrates several examples of the utility of the product platform maturity modeling system 200, the system and method taught by the disclosure may be applicable to a broad range of products, services, devices, systems, and other various product platforms across a wide range of areas. The present disclosure should therefore not be limited to the exemplary illustrations described herein, but may be presumed to have applications in numerous areas not described in the present disclosure.

Figure 3:
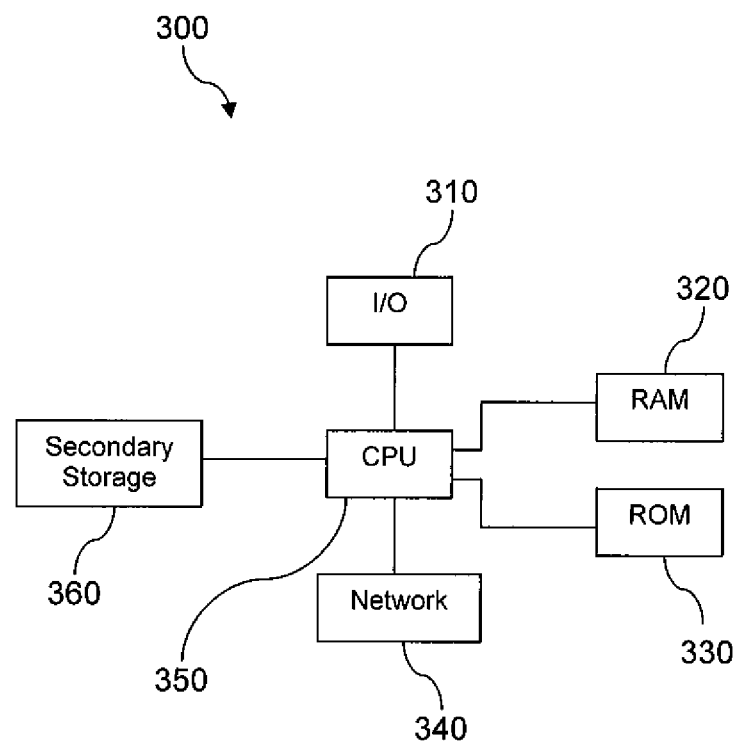
FIG. 3 illustrates an exemplary computer system suitable for implementing the several embodiments of the disclosure.

FIG. 3 illustrates a computer system 300 suitable for implementing one or more embodiments disclosed herein. The computer system 300 includes a processor 350 (which may be referred to as a central processor unit or CPU) that is in communication with memory devices including secondary storage 360, read only memory (ROM) 330, random access memory (RAM) 320, input/output (I/O) devices 310, and network connectivity devices 340. The processor 350 may be implemented as one or more CPU chips.

It is understood that by programming and/or loading executable instructions onto the computer system 300, at least one of the processor 350, the RAM 320, and the ROM 330 are changed, transforming the computer system 300 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 360 is typically comprised of one or more disk drives or tape drives and is used for non-volatile storage of data and as an over-flow data storage device if RAM 320 is not large enough to hold all working data. Secondary storage 360 may be used to store programs which are loaded into RAM 320 when such programs are selected for execution. The ROM 330 is used to store instructions and perhaps data which are read during program execution. ROM 330 is a non-volatile memory device which typically has a small memory capacity relative to the larger memory capacity of secondary storage 360. The RAM 320 is used to store volatile data and perhaps to store instructions. Access to both ROM 330 and RAM 320 is typically faster than to secondary storage 360.

I/O devices 310 may include printers, video monitors; liquid crystal displays (LCDs), touch screen displays, keyboards, keypads, switches, dials, mice, track balls, voice recognizers, card readers, paper tape readers, or other well-known input devices.

The network connectivity devices 340 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 340 may enable the processor 350 to communicate with an Internet or one or more intranets. With such a network connection, it is contemplated that the processor 350 might receive information from the network, or might output information to the network in the course of performing the above-described method steps. Such information, which is often represented as a sequence of instructions to be executed using processor 350, may be received from and outputted to the network, for example, in the form of a computer data signal embodied in a carrier wave.

Such information, which may include data or instructions to be executed using processor 350 for example, may be received from and outputted to the network, for example, in the form of a computer data baseband signal or signal embodied in a carrier wave. The baseband signal or signal embodied in the carrier wave generated by the network connectivity devices 340 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 350 executes instructions, codes, computer programs, scripts which it accesses from hard disk, floppy disk, optical disk (these various disk based systems may all be considered secondary storage 360), ROM 330, RAM 320, or the network connectivity devices 340. While only one processor 350 is shown, multiple processors may be present. Thus, while instructions may be discussed as executed by a processor, the instructions may be executed simultaneously, serially, or otherwise executed by one or multiple processors.

In an embodiment, the computer system 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 300 to provide the functionality of a number of servers that is not directly bound to the number of computers in the computer system 300. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 300, at least portions of the contents of the computer program product to the secondary storage 360, to the ROM 330, to the RAM 320, and/or to other non-volatile memory and volatile memory of the computer system 300. The processor 350 may process the executable instructions and/or data in part by directly accessing the computer program product, for example by reading from a CD-ROM disk inserted into a disk drive peripheral of the computer system 300. The computer program product may comprise instructions that promote the loading and/or copying of data, data structures, files, and/or executable instructions to the secondary storage 360, to the ROM 330, to the RAM 320, and/or to other non-volatile memory and volatile memory of the computer system 300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
    a computer having a processor and a memory; and
    an application stored in the memory that, when executed by the processor,
        aggregates data of a plurality of types of data in a data store, wherein the types of data comprise at least a research and development expense of a semiconductor chip manufacturer in a first product platform data type, a research and development expense of an equipment manufacturer in the first product platform data type, a status of a technical standard of the first product platform data type, a capital expenditure of an enterprise on the first product platform data type, and a revenue generated by the first product platform data type,
        analyzes the aggregated data associated with the first product platform data type to produce a first curve of a maturity metric of a first product platform versus time,
        determines a velocity and an acceleration of the first curve of the maturity metric, wherein the velocity of the first curve of the maturity metric is based on a rate of change of the aggregated data with respect to time, and wherein the acceleration of the first curve of the maturity metric is based on a rate of change of the velocity of the first curve of the maturity metric with respect to time,
        identifies an estimated maturity location of the first product platform with respect to time based on the determined velocity and acceleration, and
        presents the first curve of the maturity metric together with the estimated maturity location versus time to a decision maker to enable the decision maker to make a decision regarding the product platform.

2. The system of claim 1, wherein the first product platform comprises the systems, standards, and technologies that constitute an environment from which revenue may be generated.

3. The system of claim 1, wherein the first product platform is one of a long-term evolution (LTE) wireless communication product platform, a worldwide interoperability for microwave access (WiMAX) wireless communication product platform, a code division multiple access (CDMA) wireless communication product platform, a global system for mobile communication (GSM) wireless communication product platform, and a universal mobile telecommunications system (UMTS) wireless communication product platform.

4. The system of claim 1, where the plurality of data types further comprises data about a wireless spectrum allocation.

5. The system of claim 1, wherein the estimated maturity location is at least one of an introduction phase, a leading edge phase, a growth phase, a mature phase, and an obsolescence phase.

6. The system of claim 5, wherein the application analyzes the aggregated data in part based on estimated lags between the rates of change of data with respect to time of different data types.

7. The system of claim 1, wherein a decision maker makes decisions about how much money to invest in the first product platform and when to invest the money based on the presentation of the first curve.

8. The system of claim 1, wherein the first curve comprises an introduction phase during which the commercial market value of the first product platform remains undemonstrated, a leading edge phase following the introduction phase during which the commercial market value of the first product platform is demonstrated but costs are high and consumer demand is low, a growth phase following the leading edge phase during which revenue generated from the first product platform increases rapidly with respect to time, a mature phase following the growth phase during which the revenue generation is substantially flat, and an obsolete phase following the growth phase during which the revenue generation drops off substantially.

9. The system of claim 1, wherein the application further
    aggregates data of a plurality of types of data in the data store, wherein the types of data comprise at least a research and development expense of a semiconductor chip manufacturer in a second product platform data type, a research and development expense of an equipment manufacturer in the second product platform data type, a status of a technical standard of the second product platform data type, a capital expenditure of an enterprise on the second product platform data type, and a revenue generated by the second product platform data type,
    analyzes the aggregated data associated with the second product platform data type to produce a second curve of a maturity metric of the second product platform versus time, and
    presents the second curve of the maturity metric versus time.

10. A method, comprising:
    inputting into a data store, via a computer, information about a research and development investment by a semiconductor chip manufacturer in a product platform;

inputting into the data store, via the computer, information about a research and development investment by a communication equipment manufacturer in the product platform;
inputting into the data store, via the computer, information about a status of a technical standard related to the product platform;
inputting into the data store, via the computer, information about a capital expenditure of an operating company on the product platform;
inputting into the data store, via the computer, information about a revenue generated by the product platform;
analyzing, by a processor of the computer, the information in the data store to produce a curve of the maturity of the product platform versus time;
determining, by the processor, a velocity and an acceleration of the curve of the maturity metric, wherein the velocity of the curve of the maturity metric is based on a rate of change of the information with respect to time, and wherein the acceleration of the curve of the maturity metric is based on a rate of change of the velocity of the curve of the maturity metric with respect to time;
identifying, by the processor, an estimated maturity location of the product platform with respect to time based on the determined velocity and acceleration; and
presenting, by the computer, the curve of the maturity metric together with the estimated maturity location versus time to a decision maker to enable the decision maker to make a decision regarding the product platform.

11. The method of claim 10, further comprising inputting into the data store, via the computer, information about a certification of compliance with the technical standard of a semiconductor chip set.

12. The method of claim 10, wherein the information about the status of the technical standard comprises at least one of a revision level of the technical standard, a number of working groups developing the technical standard, and a number of company members of a standards body developing the technical standard.

13. The method of claim 10, wherein the decision is to stop further investment in the product platform based on the curve of the maturity of the product platform entering an obsolescence phase.

14. The method of claim 10, wherein the decision is to encourage a subscriber to migrate from the product platform to a second product platform based on the curve of the maturity of the product platform entering an obsolescence phase.

15. The method of claim 10, wherein the product platform comprises one of a long-term evolution (LTE) wireless communication product platform, a worldwide interoperability for microwave access (WiMAX) wireless communication product platform, a code division multiple access (CDMA) wireless communication product platform, a global system for mobile communication (GSM) wireless communication product platform, and a universal mobile telecommunications system (UMTS) wireless communication product platform.

16. The method of claim 10, wherein the information about revenue generation comprises one of information about consumer sales of electronic devices associated with the product platform and information about corporate sales of feature sets associated with the product platform.

17. A computer based decision support system, comprising:
a computer having a processor and a memory; and
an application stored in the memory that, when executed by the processor,
aggregates data from at least two data types comprising a research and development expense of a semiconductor chip manufacturer in a product platform data type, a research and development expense of an equipment manufacturer in the product platform data type, a status of a technical standard of the product platform data type, a capital expenditure of an enterprise on the product platform data type, and a revenue generated by the product platform data type,
analyzes the aggregated data to determine a sensitivity of a maturity metric of the product platform versus time to a variation in data from one of the at least two data types;
presents the sensitivity of the maturity metric of the product platform versus time to a variation in data, wherein a decision maker visualizes the value of obtaining further data of the data type subject to the sensitivity analysis,
analyzes the aggregated data to produce a curve of a maturity metric of the product platform versus time,
determines a velocity and an acceleration of the first curve of the maturity metric, wherein the velocity of the first curve of the maturity metric is based on a rate of change of the aggregated data with respect to time, and wherein the acceleration of the first curve of the maturity metric is based on a rate of change of the velocity of the first curve of the maturity metric with respect to time,
identifies an estimated maturity location of the product platform with respect to time based on the determined velocity and acceleration, and
presents the curve of the maturity metric together with the estimated maturity location versus time to a decision maker to enable the decision maker to make a decision regarding the product platform.

18. The computer based decision support system of claim 17, wherein the application further aggregates data from a data type comprising a wireless spectrum allocation.

* * * * *